United States Patent
Meng (10) Patent No.: US 9,755,816 B2
(45) Date of Patent: *Sep. 5, 2017

(54) DYNAMIC TDD CONFIGURATION METHOD AND A BASE STATION USING THE SAME

(71) Applicant: HTC Corporation, Taoyuan County (TW)

(72) Inventor: Ling-San Meng, Taoyuan County (TW)

(73) Assignee: HTC Corporation, Taoyuan (TW)

(*) Notice: Subject to any disclaimer, the term of this patent is extended or adjusted under 35 U.S.C. 154(b) by 161 days.

This patent is subject to a terminal disclaimer.

(21) Appl. No.: 14/228,267

(22) Filed: Mar. 28, 2014

(65) Prior Publication Data

US 2014/0293844 A1 Oct. 2, 2014

Related U.S. Application Data

(60) Provisional application No. 61/806,380, filed on Mar. 28, 2013.

(51) Int. Cl.
- *H04L 5/14* (2006.01)
- *H04B 7/26* (2006.01)
- *H04W 72/04* (2009.01)

(52) U.S. Cl.
CPC ......... *H04L 5/1438* (2013.01); *H04B 7/2656* (2013.01); *H04W 72/042* (2013.01)

(58) Field of Classification Search
CPC .................................................... H04L 5/1438
See application file for complete search history.

(56) References Cited

U.S. PATENT DOCUMENTS 9,137,804 B2 * 9/2015 Lin ...................... H04W 72/048
9,203,559 B2 * 12/2015 Wang .................... H04L 1/1671
(Continued)

FOREIGN PATENT DOCUMENTS

| CN | 102196580 | 9/2011 |
|---|---|---|
| EP | 2498419 | 9/2012 |
| GB | 2432484 | 12/2007 |

OTHER PUBLICATIONS

3GPP, "3GPP TR 36.828 V11.0.0, 3rd Generation Partnership Project; Technical Specification Group Radio Access Network; Evolved Universal Terrestrial Radio Access (E-UTRA); Further enhancements to LTE Time Division Duplex (TDD) for Downlink-Uplink (DL-UL) interference management and traffic adaptation (Release 11)," Technical Report, Jun. 2012, pp. 1-109.
(Continued)

*Primary Examiner* — Rasheed Gidado
(74) *Attorney, Agent, or Firm* — Jianq Chyun IP Office (57) ABSTRACT

Accordingly, the present disclosure is directed to a dynamic time division duplex (TDD) configuration method and a base station using the same method. According to one of the exemplary embodiments, the present disclosure is directed to A dynamic TDD configuration method, applicable to a base station, and the method includes the steps of transmitting a current time division duplex (TDD) configuration, selecting a dynamic TDD configuration based on the current TDD configuration after transmitting the current TDD configuration, and transmitting the dynamic TDD configuration, wherein, the dynamic TDD configuration is a subset of an allowable set comprising one or more possible TDD configurations by which each downlink subframe of the current TDD configuration is not re-configured to a uplink subframe by the dynamic TDD configuration selected from the allowable set.

18 Claims, 7 Drawing Sheets

(56) References Cited

U.S. PATENT DOCUMENTS

| | | | | |
|---|---|---|---|---|
| 9,219,595 | B2* | 12/2015 | Yin | H04L 5/14 |
| 2011/0176461 | A1* | 7/2011 | Astely | H04B 7/2656 |
| | | | | 370/280 |
| 2013/0188516 | A1* | 7/2013 | He | H04W 28/16 |
| | | | | 370/254 |
| 2013/0194980 | A1* | 8/2013 | Yin | H04L 1/1854 |
| | | | | 370/280 |
| 2013/0301492 | A1* | 11/2013 | Ji | H04L 5/14 |
| | | | | 370/280 |
| 2014/0010128 | A1* | 1/2014 | He | H04W 4/06 |
| | | | | 370/280 |
| 2014/0086112 | A1* | 3/2014 | Stern-Berkowitz | H04W 72/1289 |
| | | | | 370/280 |
| 2014/0119261 | A1* | 5/2014 | Wang | H04W 72/04 |
| | | | | 370/312 |
| 2014/0122957 | A1* | 5/2014 | Charbit | H04L 1/08 |
| | | | | 714/748 |
| 2014/0177486 | A1* | 6/2014 | Wang | H04L 5/0053 |
| | | | | 370/280 |
| 2014/0269539 | A1* | 9/2014 | Yin | H04L 5/0092 |
| | | | | 370/329 |

OTHER PUBLICATIONS

ETSI, "ETSI TS 136 211 V11.0.0, LTE; Evolved Universal Terrestrial Radio Access (E-UTRA); Physical channels and modulation (3GPP TS 36.211 version 11.0.0 Release 11)," Technical Specification, Oct. 2012, pp. 1-108.
ETSI, "ETSI TS 136 213 V11.0.0, LTE; Evolved Universal Terrestrial Radio Access (E-UTRA); Physical layer procedures (3GPP TS 36.213 version 11.0.0 Release 11)," Technical Specification, Oct. 2012, pp. 1-145.
Mediatek Inc: "Support for legacy UEs in adaptive TDD systems", 3rd Generation Partnership Project (3GPP), Mobile Competence Centre; 650, Route Des Lucioles; vol. RAN WG1, No. St. Julian; Jan. 28, 2012-Feb. 1, 2012, Jan. 19, 2013, XP050663597, p. 1-p. 4.
Renesas Mobile Europe Ltd: "Discussion on backward compatibility for TDD UL-DL reconfiguration", 3rd Generation Partnership Project (3GPP), Mobile Competence Centre; 650, Route Des Lucioles; vol. RAN WG1, No. R1-130421, Jan. 28, 2013, XP002727884, p. 1-p. 4.
LG Electronics: "Issues in Further Enhancements to LTE TDD", 3rd Generation Partnership Project (3GPP), Mobile Competence Centre; 650, Route Des Lucioles; vol. RAN WG1, No. Jeju, Korea; Mar. 26, 2012-Mar. 30, 2012, Mar. 20, 2012, XP050599742, p. 1-p. 4.
"Search Report of European Counterpart Application", issued on Aug. 12, 2014, p. 1-p. 6.
"Office Action of Related U.S. Appl. No. 14/267,908", issued on Jan. 6, 2016, p. 1-p. 11.
"Office Action of China Counterpart Application", issued on Dec. 30, 2016, p. 1-p. 8.
St. Julian's et al., "Support for legacy UEs in adaptive TDD systems", 3GPP TSG-RAN1 #72 Meeting, Feb. 2012, 1-4.

* cited by examiner

| Uplink-Downlink Configuration | Subframe Number | | | | | | | | | |
|---|---|---|---|---|---|---|---|---|---|---|
| | 0 | 1 | 2 | 3 | 4 | 5 | 6 | 7 | 8 | 9 |
| 0 | D | S | U | U | U | D | S | U | U | U |
| 1 | D | S | U | U | D | D | S | U | U | D |
| 2 | D | S | U | D | D | D | S | U | D | D |
| 3 | D | S | U | U | U | D | D | D | D | D |
| 4 | D | S | U | U | D | D | D | D | D | D |
| 5 | D | S | U | D | D | D | D | D | D | D |
| 6 | D | S | U | U | U | D | S | U | U | D |

| TDD Configuration | Set of allowed dynamic TDD configurations, Bi |
|---|---|
| 0 | 0 |
| 1 | 1,2,4,5 |
| 2 | 2,5 |
| 3 | 3,4,5 |
| 4 | 4,5 |
| 5 | 5 |
| 6 | 6 |

DYNAMIC TDD CONFIGURATION METHOD AND A BASE STATION USING THE SAME

CROSS REFERENCE TO RELATED APPLICATION

This application claims the priority benefit of U.S.A. provisional application Ser. No. 61/806,380, filed on Mar. 28, 2013. The entirety of the above-mentioned patent application is hereby incorporated by reference herein and made a part of specification.

TECHNICAL FIELD

The present disclosure directs to a dynamic time division duplex (TDD) configuration method and a base station using the same method.

BACKGROUND

The topic of "Further Enhancements to LTE Time Division Duplex (TDD) for Downlink-Uplink (DL-UL) Interference Management and Traffic Adaptation" has been agreed as a study item in 3GPP release 11 and a work item in 3GPP release 12. Performance evaluation of various deployment scenarios has been conducted by both 3GPP RAN 1 and RAN 4 working groups. It has been shown that an average cell throughput can be improved to a large extend by allowing dynamic reconfigurations in Long Term Evolution (LTE) time division duplex (TDD) systems.

Figure 1:
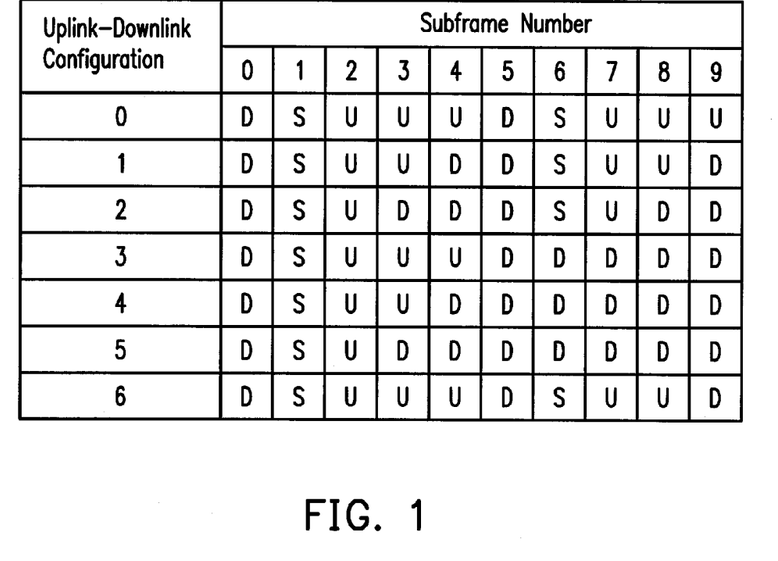
FIG. 1 is a table which illustrates a current uplink-downlink configuration in a LTE communication system.

The TDD scheme would offer flexible deployments without requiring a multiple spectrum resources. Currently, the LTE TDD would allow for asymmetric downlink-uplink (DL-UL) allocations by providing seven different semi-statically configured DL-UL configurations as illustrated in FIG. 1, and these allocations can provide between 40% and 90% DL subframes. To be more specific, the seven different semi-statically configured DL-UL configurations are indexed in the left most column of FIG. 1 and are numbered between 0~6. In the present disclosure, a DL-UL configuration is also referred to as a TDD configuration or a TDD DL-UL configuration. For each TDD configuration, subframes of a radio frame would be configured as a downlink subframe, as an uplink subframe, or as a special subframe, and the top row of FIG. 1 shows the index of the subframe numbers. Therefore, in order to configure a radio frame to have a certain number of downlink and uplink slots, an evolved Node B (eNB) would transmit one of the UL-DL configurations in system information (SI).

For example, if heavy downlink traffic has been experienced by the network, the eNB could decide upon the TDD configuration 5 which would be transmitted to UEs and would provide 8 downlink slots and 1 uplink slot per radio frame. However, if heavy downlink traffic has all in a sudden been changed to heavy uplink traffic, the eNB may not change the TDD configuration instantly but has to convey the change by modifying the system information, and the modification of the system information for a legacy UE could only occur at a modification boundary. This would mean that the re-configuration of the TDD configuration via the SI change would be semi-static rather than dynamic and may not match the instantaneous traffic situation.

In comparison to the system information change procedure, known dynamic re-configuration techniques would require a much shorter period for TDD reconfiguration. Evaluation in the corresponding study item reveal significant performance benefits by allowing TDD DL-UL reconfiguration based on traffic adaptation in small cells as mentioned in "*Further enhancements to LTE Time Division Duplex (TDD) for Downlink-Uplink (DL-UL) interference management and traffic adaptation,*" 3GPP TR 38.828, V11.0.0, 2012-06, which is incorporated by reference for definition purposes. Also, it was shown that a dynamic signaling mechanism would outperform the mechanism that uses the system information change procedure.

Also for definition purposes, the TDD frame structure, DL-UL configurations, and the UL-HARQ timing relations could be defined according to "*Physical Channels and Modulation,*" 3GPP TS 36.211, V11.0.0, 2012-09 and "*Physical Layer Procedures,*" 3GPP TS.213, V11.0.0, 2012-09, which are both incorporated by reference for definition purposes.

However, using dynamic techniques to re-configure a TDD configuration would cause legacy UEs without a dynamic re-configuration capability and new UEs possessing such capability to have different understandings of the TDD DL-UL configuration, since legacy UEs must follow the system information change procedure while new UE would be able to re-configure the TDD DL-UL configuration via dynamic signaling mechanisms such as physical layer signaling, medium access control (MAC) signaling, or radio resource control (RRC) signaling. This could potentially lead to a variety of problems including problems caused by UE measurements as well as Hybrid Automatic Repeat Request (HARQ) operations.

HARQ is referred to as a transmission technique widely used in modern wireless communication systems. HARQ operates by re-transmitting an identical copy of the original transmission or another redundancy version upon transmission error. The receiver then combines the previously corrupted transmissions with the retransmitted one. In LTE TDD systems, the timing relation between the feedback information indicating a transmission error and corresponding retransmission are separately and differently defined for each of the 7 configurations due to the different allocation of the DL-UL subframes. However, sudden changes of TDD configuration could cause interferences of the HARQ operation between legacy UEs and UEs having the dynamic re-configuration capability.

As legacy UEs (before release 12) are not compatible with the technique of dynamic TDD DL-UL reconfiguration, a new design could be required in order to avoid the possible conflicts between legacy UEs and new UEs (release 12 and beyond).

SUMMARY OF THE DISCLOSURE

Accordingly, the present disclosure is directed to a dynamic time division duplex (TDD) configuration method and a base station using the same method.

According to one of the exemplary embodiments, the present disclosure is directed to A dynamic TDD configuration method, applicable to a base station, and the method includes the steps of transmitting a current time division duplex (TDD) configuration, selecting a dynamic TDD configuration based on the current TDD configuration after transmitting the current TDD configuration, and transmitting the dynamic TDD configuration, wherein, the dynamic TDD configuration is a subset of an allowable set comprising one or more possible TDD configurations by which each downlink subframe of the current TDD configuration is not re-configured to a uplink subframe by the dynamic TDD configuration selected from the allowable set.

According to one of the exemplary embodiments, the present disclosure is directed to a base station which includes at least but not limited to a transmitter and a receiver which would transmit and receive data respectively and a processor coupled to the transmitter and the receiver. The processor is configured for transmitting a current time division duplex (TDD) configuration through the transmitter, transmitting a dynamic TDD configuration after transmitting the current TDD configuration through the transmitter, wherein, the dynamic TDD configuration is a subset of an allowable set comprising one or more possible TDD configurations by which each downlink subframe of the current TDD configuration is not re-configured to a uplink subframe by the dynamic TDD configuration selected from the allowable set.

In order to make the aforementioned features and advantages of the present disclosure comprehensible, exemplary embodiments accompanied with figures are described in detail below. It is to be understood that both the foregoing general description and the following detailed description are exemplary, and are intended to provide further explanation of the disclosure as claimed.

It should be understood, however, that this summary may not contain all of the aspect and embodiments of the present disclosure and is therefore not meant to be limiting or restrictive in any manner. Also the present disclosure would include improvements and modifications which are obvious to one skilled in the art.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DETAILED DESCRIPTION OF DISCLOSED EMBODIMENTS

Reference will now be made in detail to the present exemplary embodiments of the disclosure, examples of which are illustrated in the accompanying drawings. Wherever possible, the same reference numbers are used in the drawings and the description to refer to the same or like parts.

Currently, TDD LTE allows for asymmetric DL-UL subframe allocations of a radio frame by providing seven different semi-statically configurations. In 3GPP release 12, a dynamic TDD configuration (eIMTA) is introduced so that a base station could dynamically configure or re-configure a TDD configuration based on traffic conditions. The present disclosure is concerned with a single carrier LTE TDD system with the functionality of dynamic TDD DL-UL reconfigurations. In such a system, using dynamic techniques to configure or re-configure a TDD configuration would cause problems between legacy UEs without a dynamic re-configuration capability and new UEs possessing a dynamic re-configuration capability as legacy UEs would have a different understanding of the current TDD DL-UL configuration from new UEs since legacy systems do not support the dynamic re-configuration functionality. Consequently, there would be a variety of problems, most notably problems related to UE measurements and HARQ operations. When the dynamic TDD configuration mechanism is being used, a legacy UE (release 11 or before) will face a variety of problems.

One of the problems could be related to legacy UEs having incorrect DL signaling quality measurement results if some DL subframes have been dynamically changed to UL subframes. The measurement results would most likely be inaccurate if certain DL subframes have been dynamically changed to UL subframes. More specifically, downlink reference signals would normally accompany a downlink, and uplink reference signals would normally accompany an uplink. Also as specified by current LTE standards, legacy UEs are required to perform signal quality measurement in all DL subframes. Therefore, when a downlink subframe has been dynamically switched to an uplink subframe, a legacy UE, which lacks the capability to dynamically re-configure TDD subframe configurations, might still be performing a downlink signal quality measurement except with reference signals which are used for uplink and are intended for new UEs having dynamic TDD re-configuration capability. By using incorrect reference signals, legacy UEs would most likely obtain incorrect signal quality measurements.

Another one of the problems would be related to the legacy UEs' UL HARQ transmissions and retransmissions which could interfere with new UEs if the subframes for which the transmission/re-transmission take place have been dynamically changes to a DL subframe. Such problems could severely affect the system performance and scheduling flexibility in TDD systems having dynamic DL-UL reconfiguration. In other words, if UL HARQ occurs in a subframe that is changed to a DL subframe, the UL HARQ will interfere with the new UE.

A dynamic re-configuration here means that a re-configuration is implemented by using a fast signaling mechanism such as a physical layer signaling, a MAC layer signaling, or a RRC signaling; whereas a re-configuration for legacy UEs is resorted to using the conventional SIB transmission which conveys a new re-configuration after a modification period. This would imply that as new UEs are dynamically configured to a new TDD configuration, legacy UEs may still implement a default TDD configuration for the current SI modification period until the TDD configuration has been changed in the next SI modification period.

In view of the aforementioned problems, since the TDD configuration of new UEs cannot be re-configured dynamically by fast signalings in an unrestricted manner, the present disclosure proposes a dynamic TDD configuration mechanism which imposes certain rules or constraints to the dynamic TDD configuration/re-configuration mechanism. Specific concepts and embodiments of the disclosure are to be elucidated by FIG. 2~FIG. 6 and the corresponding written descriptions for these FIGs to be provided forth.

Figure 2:
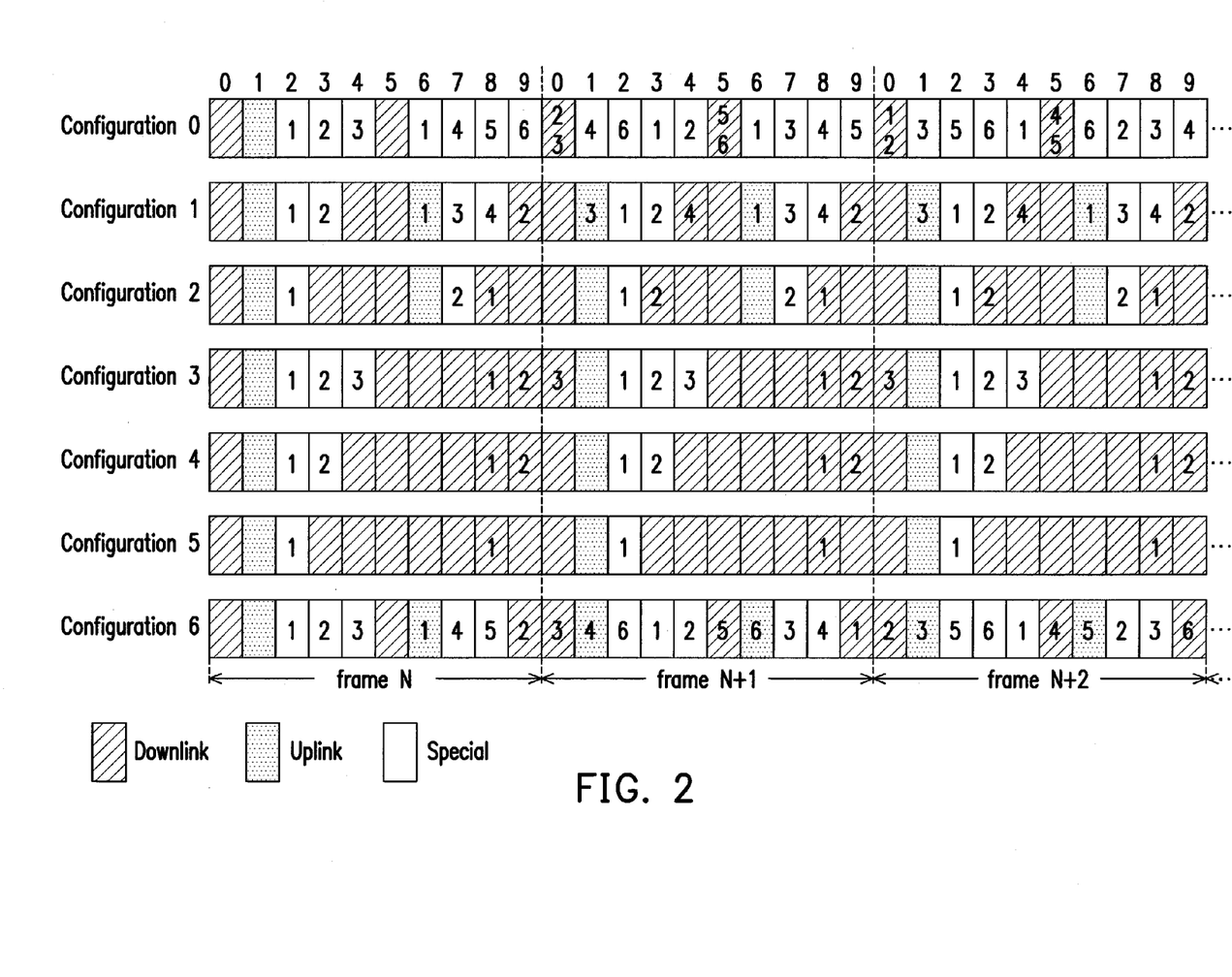
FIG. 2 is a table which illustrates UL HARQ timelines for the seven TDD configurations in a LTE communication system.

FIG. 2 is a table which illustrates UL HARQ timelines for the seven TDD configurations in a LTE communication system, and FIG. 2 would serve to elucidate inventive concepts of the disclosure. In a TDD system for LTE, HARQ would be implemented in a different manner from a FDD system where an ACK/NACK message in response to a transmission on a subframe would occur at a relatively fixed interval. However, for a TDD system, an ACK/NACK message in response to a transmission on a subframe would not occur at a fixed interval because of the variable numbers of uplink subframes and downlink subframes for different TDD configurations. In general, when a downlink subframe has been used to receive downlink data, a next uplink subframe which is at least four subframes away would be used to transmit ACK/NACK, and vice versa. The four subframes delay is due to the processing delay of the receiving end.

For example, taking configuration 4 for simplicity's sake, when a first uplink is transmitted by a UE on subframe numbers 2 in frame N, the corresponding ACK/NACK would be received by the same UE at subframe number 8 of frame N. Similarly when a second uplink is transmitted on subframe number 3 in frame N, the corresponding ACK/NACK would be received at subframe number 9 of frame N. When a ACK/NACK signaling is received by the UE at subframe number 8, the corresponding retransmission would be transmitted by the UE at subframe number 2 of frame N+1, and so forth.

In view of FIG. 2, the rational basis behind the present disclosure would be evident upon the following reasoning. From FIG. 2, it would be noted that if a DL subframe is dynamically changed to a UL subframe, legacy UEs would obtain incorrect DL channel quality measurement for the reason already described. However, if a UL subframe is dynamically changed to a DL subframe, no problem would occur. The reason is that a serving base station of a UE would have control over when the UE supposes to transmit uplink data to the serving base station. By controlling the UE to not transmit uplink data in the same time slot as new UEs which receive downlink data, no problem would occur. Also when UL HARQ of legacy UEs occurs in the subframe that is dynamically changed to a DL subframe for new UEs, the UL HARQ of legacy UEs will interfere with DL of new UEs.

In view of the rationale above, the present disclosure proposes a dynamic TDD configuration mechanism which follows at least one or more of the following three criteria as appropriate relationships between dynamic TDD DL-UL configurations for new UEs and the currently configured TDD DL-UL configuration would be required. (1) A dynamic TDD configuration for new UEs would need to be based on the current configured TDD configuration for legacy UEs. (2) The situation in which the UL HARQ of legacy UE occurs in a subframe that has been dynamically re-configured to a DL subframe for new UEs would need to be avoided so that the UL HARQ of legacy UEs would not interfere with DL of new UEs. (3) The situation in which a DL subframe is dynamically re-configured to a UL subframe would need to be avoided. By following the above mentioned criteria, when a base station dynamically configure or re-configure a subframe for new UEs which possess the dynamic TDD re-configuration capability, the base station would choose from a TDD configuration set such as the one of FIG. 1 to determine a new dynamic TDD configuration which satisfies the three criteria for new UEs.

Figure 3A:
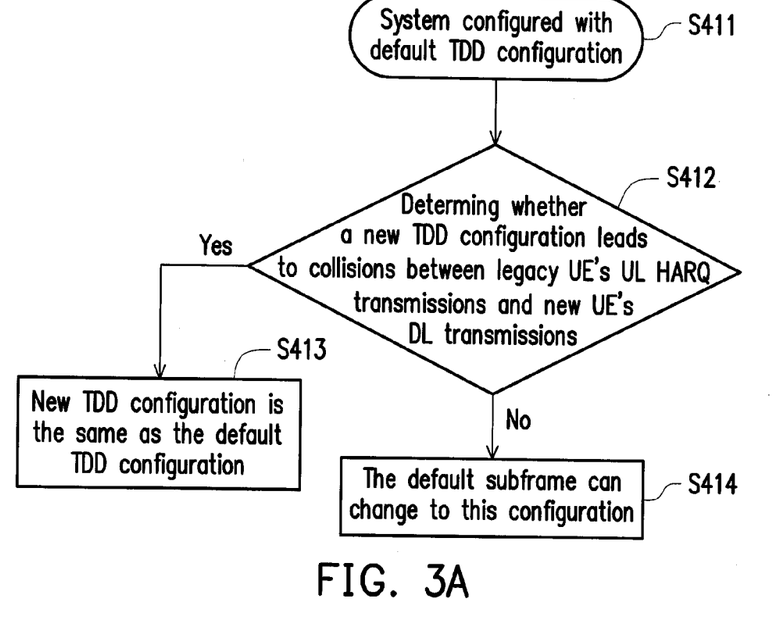
FIG. 3A is a flow chart which illustrates a technique to determine a set of allowable dynamic TDD configuration that corresponds to each current TDD configuration in accordance with an exemplary embodiment of the present disclosure.
Figure 3B:
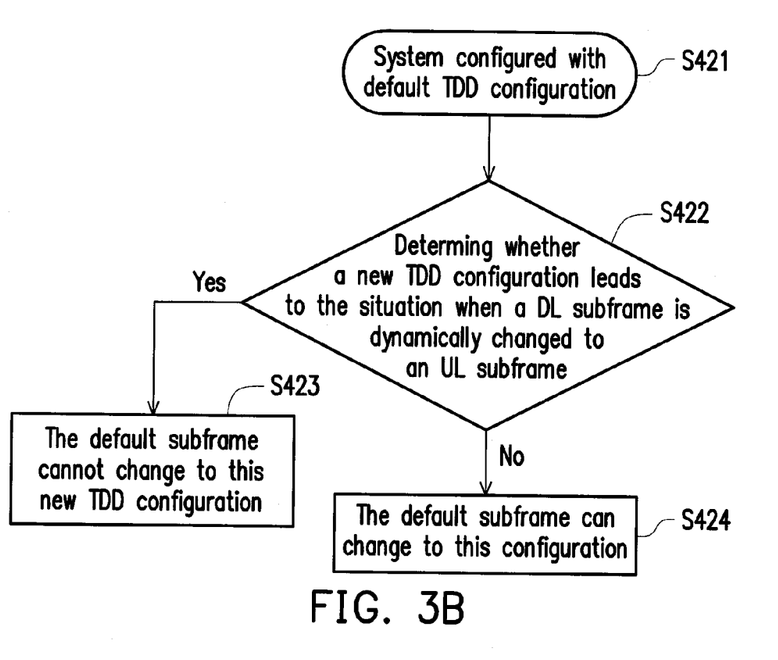
FIG. 3B is a flow chart which illustrates another technique of determining a set of allowable dynamic TDD configuration that corresponds to each current TDD configuration in accordance with an exemplary embodiment of the present disclosure.
Figure 3C:
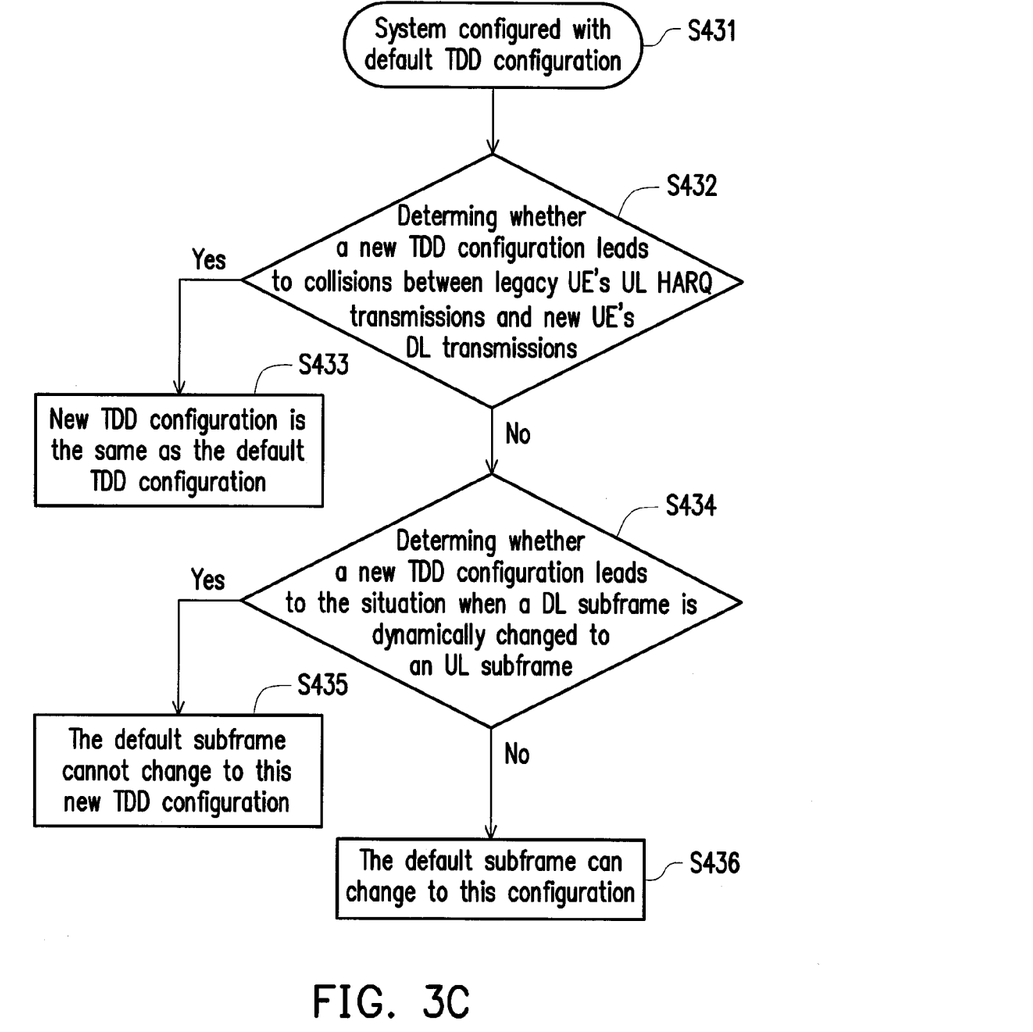
FIG. 3C is a flow chart which illustrates one possible combination using the technique of FIG. 3A and FIG. 3B.

FIG. 3A~3C are flow charts which illustrate various determining logic which determines whether a dynamic TDD configuration would be appropriate. FIG. 3A is a flow chart which illustrates a first determining logic, and the determining logic could be applicable for both new UEs and base stations capable of dynamic TDD configuration mechanism for different purposes. In step S411, a system is configured with a default TDD configuration. The default configuration could be a dynamic TDD configuration which was previously configured, or the default configuration could be a current TDD configuration which is used by the legacy UE. In step S412, whether a dynamic TDD configuration would lead to interferences between legacy UEs' UL HARQ transmissions and new UEs' DL transmissions would be determined. If so, in step S413, the dynamic TDD configuration would be discarded and a new dynamic TDD configuration could be determined. If no interferences could occur in step S412, then in step S414, the default subframe configuration would be changed to the dynamic TDD configuration.

FIG. 3B is a flow chart which illustrates a second determining logic, and the determining logic could be applicable for both new UEs and base stations capable of dynamic TDD configuration mechanism for different purposes. In step S421, a system is configured with a default TDD configuration. The default configuration could be a dynamic TDD configuration which was previously configured, or the default configuration could be a current TDD configuration which is used by the legacy UE. In step S422, whether the dynamic TDD configuration would lead to a situation in which a DL subframe is dynamically changed to a UL subframe would be determined. If so, then in step S423, the default subframe cannot be changed to this dynamic TDD configuration as a new dynamic TDD configure might need to be determined. In step S424, if the dynamic TDD configuration would not lead to the situation in which a DL subframe is dynamically changed to a UL subframe, then the dynamic TDD configuration instead of the default TDD configuration would be used by new UEs to transmit and receive data. Also the dynamic TDD configuration would belong to an allowable set or in other words be considered as an appropriate dynamic TDD configuration. It should be noted that the determining logic of FIG. 3A and FIG. 3B can be independently applied.

FIG. 3C is one possible combination of the determination logic of FIG. 3A and FIG. 3B. In step S431, a system is configured with a default TDD configuration. The default configuration could be a dynamic TDD configuration which was previously configured, or the default configuration could be a current TDD configuration which is used by the legacy UE. In step S432, whether a dynamic TDD configuration would lead to interferences between legacy UEs' UL HARQ transmissions and new UEs' DL transmissions would be determined. If so, in step S433, the dynamic TDD configuration would be discarded and a new dynamic TDD configuration could be determined. If no interferences could occur in step S432, then in step S434, whether the dynamic TDD configuration would lead to a situation in which a DL subframe is dynamically changed to a UL subframe would be determined. If so, then in step S435, the default subframe cannot be changed to this dynamic TDD configuration as a new dynamic TDD configure might need to be determined. In step S434, if the dynamic TDD configuration would not lead to the situation in which a DL subframe is dynamically changed to a UL subframe, then the dynamic TDD configuration instead of the default TDD configuration would be used by new UEs to transmit and receive data. Also the dynamic TDD configuration would belong to an allowable set or in other words be considered as an appropriate dynamic TDD configuration. It should be noted that it should be evident for an ordinary person skilled in the art that the steps S432 and S433 can be swapped with the steps S434 and S435 as implementing FIG. 3A first before FIG. 3B or implementing FIG. 3B first before implementing FIG. 3A would generate the same result.

By following the determining logic of FIG. 3A~3C, a set of allowed dynamic TDD configuration that corresponds to each current TDD configuration in accordance with an exemplary embodiment of the present disclosure could be derived. Based on the TDD configurations of the table of FIG. 1, a set of allowable TDD configuration could be determined for each of the seven TDD configuration of FIG. 1 by following the determining logic of FIG. 3A~3C. One of such results could be summarized as a table shown in FIG. 4 which shows the result of applying both the determining of FIG. 3A and FIG. 3B, and the table could be stored in both a base station and a new UE so that both the base station and the new UE could determine whether a dynamic TDD configuration is appropriate or allowable by using the table. It should be noted that, if a different set of TDD configuration is used instead of FIG. 1, the principle of the present disclosure could still be followed by an ordinary person skilled in the art to generate a different table by following the three aforementioned criteria implemented by the determining logic of FIG. 3A~3C.

Figure 4:
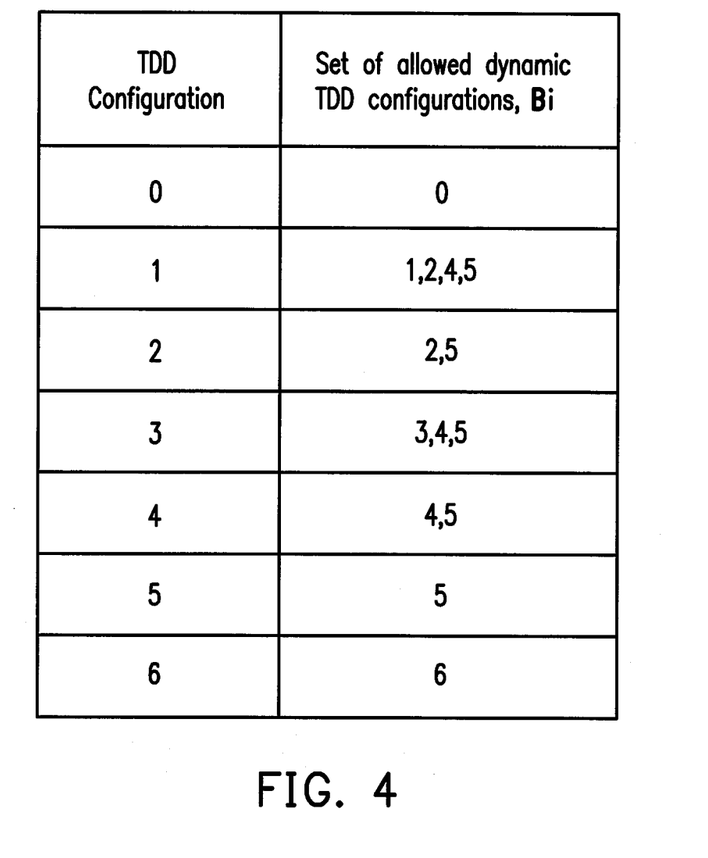
FIG. 4 is a table which illustrates the end result of using the techniques of FIGS. 3A & 3B in accordance with an exemplary embodiment of the present disclosure.

The derivation of the table of FIG. 4 would be further elucidated in the followings. For ease of exposition, a set of the current TDD configuration signaled to legacy UEs could be denoted by i; i∈{0,1,2,3,4,5,6} which are the complete set of current TDD configurations as shown in FIG. 1. Since dynamic TDD configuration would be based on the current TDD configuration, i, an appropriate set of dynamic TDD configuration for each of the current TDD configuration for new UEs could be denoted by $B_i$, based on i.

Following the principle of step S412, it could be noted that all UL HARQ timelines repeat themselves every radio frame which is 10 ms except for TDD configuration 0 and 6. By dynamically changing TDD configurations for i=0 or i=6 to a different TDD configuration would lead to interference between legacy UEs' UL HARQ transmissions and new UEs' DL transmissions, since it can be observed from FIG. 2 that the UL HARQ timeline does not repeat identically between each set of radio frames. Therefore $B_0=\{0\}$ and $B_6=\{6\}$. This would mean when the current TDD configuration is configuration 0 for the legacy UE, the dynamic TDD configuration cannot be changed and should stay at 0. When the current TDD configuration is configuration 6 for the legacy UE, the dynamic TDD configuration cannot be changed and should stay at 6. Therefore, by following the determining logic of FIG. 3A alone, $B_0=\{0\}$, $B_1=\{1, 2, 3, 4, 5\}$, $B_2=\{1, 2, 3, 4, 5\}$, $B_3=\{1, 2, 3, 4, 5\}$, $B_4=\{1, 2, 3, 4, 5\}$, $B_5=\{1, 2, 3, 4, 5\}$, and $B_6=\{6\}$ when i=0, 1, 2, 3, 4, 5, 6 respectively.

The principle of step S422 would be followed to avoid legacy UEs having incorrect DL measurement results so that the situation in which a DL subframe is dynamically changed to an UL subframe would be avoided. As a consequence, the set Bi is composed of the TDD configurations whose DL subframes constitute a superset of that in configuration i. Therefore, by following the principle of FIG. 3B alone, when i=0, $B_0=\{0, 1, 2, 3, 4, 5, 6\}$, when i=1, $B_1=\{1, 2, 4, 5\}$, when i=2, $B_2=\{2, 5\}$, when i=3, $B_3=\{3, 4, 5\}$, when i=4, $B_4=\{4, 5\}$, when i=5, $B_5=\{5\}$, and when i=6, $B_6=\{1, 2, 3, 4, 5, 6\}$.

If the criteria of both FIG. 3A & FIG. 3B would need to be satisfied, what is shown in FIG. 4 would be the result of the combination of the determine logic of FIG. 3A & FIG. 3B, and one such combination could be the determining logic of FIG. 3C. In order to satisfy the criteria of FIG. 3A, when i=0 or 6, $B_0=\{0\}$ or $B_6=\{6\}$ respectively. In order to satisfy the criteria of FIG. 3B, when i=1, $B_i=\{1, 2, 4, 5\}$, when i=2, $B_2=\{2, 5\}$, when i=3, $B_3=\{3, 4, 5\}$, when i=4, $B_4=\{4, 5\}$, when i=5, $B_5=\{5\}$. The above mentioned result would be summarized as FIG. 4.

The derivation of FIG. 4 when i=1, 2, 3, 4, and 5 would be further provided with these following examples. Referring to the illustration of FIG. 2, assuming the current TDD configuration is configuration 1, configuration 2 would belong to an allowable set of TDD configuration. The reason is that the DL subframes of configuration 1 are subframes 0, 4, 5, and 9, and the DL subframes of configuration 2 are subframes 0, 3, 4, 5, 8, 9. Since subframes 0, 4, 5, and 9 is a subset of subframes 0, 3, 4, 5, 8, 9, no DL subframe of configuration 1 would be dynamically change to a UL subframe after switching to configuration 2. The same holds true for configuration 4 and 5 for which no DL subframe of configuration 1 would be dynamically changed to a UL subframe after switching configuration 5. Notice that for configuration 3, the DL subframe number 4 would be switched to an UL subframe after switching from configuration 1 to configuration 3; therefore, configuration 3 does not belong to the set of dynamic TDD configurations of configuration 1. Also it was already mentioned that for the case when the current TDD configuration 1, the possibility of switching configuration 0 or 6 has been eliminated since if configuration 1 is switched to either of configurations 0 and 6, UL HARQ would occur in the subframe that is changed to a DL subframe so that the UL HARQ of a legacy UE would interfere with the HARQ of a new UE.

For another example, observe configuration 5 of FIG. 2. Since configuration 5 of all configuration of FIG. 1 has the most DL subframes, it would not be possible for configuration 5 to switch to another configuration without having at least one DL subframe switching to a UL subframe. Therefore, the allowable subset of dynamic TDD configuration for configuration 5 would only be configuration 5. Since the allowable subset other configurations could be derived by an ordinary person skilled in the art by following the above mentioned principle and examples, the derivations for other configurations will not be repeated.

Therefore, the table of FIG. 4 would be stored in the memory of new UEs and serving base stations of new UEs which possess the dynamic TDD configuration/re-configuration capability. When a base station has to dynamically adjust the TDD configuration of new UEs because of the demands of the network traffic, the base station would select the dynamic TDD configuration for new UEs from the allowable set of dynamic TDD configuration(s) corresponding to each of the current TDD configuration for legacy UEs. For example, if the current TDD configuration for legacy UEs is 3, then according to FIG. 4, the dynamic TDD configuration cannot be other than configurations 3, 4, or 5.

If the current TDD configuration for legacy UEs is 0, 5, or 6, then dynamic TDD re-configuration would essentially be not allowed until the current TDD configuration has been changed to a different current TDD configuration such as configurations 1, 2, 3, and 4 via a change in the SI.

It should be noted that, in an alternative embodiment, instead of using a lookup table stored in a memory, the determination logic in the form of a digital or analogue circuit could be used to determine whether a dynamic TDD configuration belongs to an allowable set which is based on the current TDD configuration used by the legacy UE.

Figure 5:
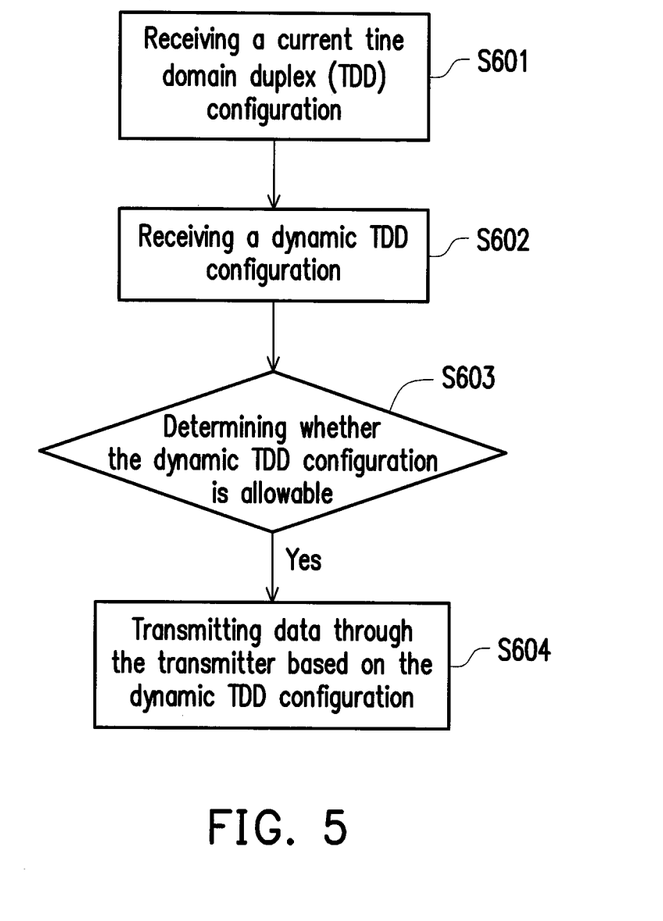
FIG. 5 illustrates a proposed dynamic TDD configuration mechanism from the perspective of a user equipment in accordance with an exemplary embodiment of the present disclosure.

FIG. 5 summarizes a proposed dynamic TDD configuration mechanism from the perspective of a user equipment (UE) in accordance with an exemplary embodiment of the present disclosure. In step S601, a UE may receive a current time division duplex (TDD) configuration which could be legacy UE compatible and could be receive via the SI. In step S602, the UE may receive a dynamic TDD configuration. In step S603, the UE may determine whether the dynamic TDD configuration belongs to an allowable set of TDD configuration, and the allowable set of TDD configuration would be determined based on the current TDD configuration. In step S604, the UE would transmit data based on the dynamic TDD configuration if the dynamic TDD configuration belongs to the allowable set.

Figure 6:
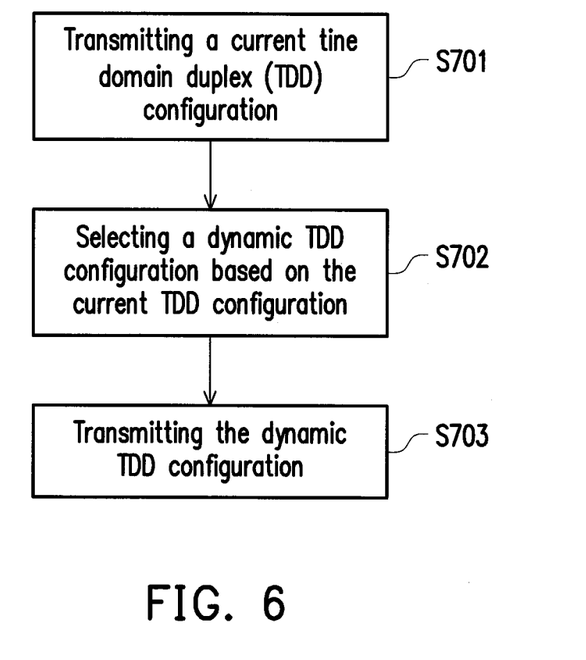
FIG. 6 illustrates a proposed dynamic TDD configuration mechanism from the perspective of a base station in accordance with an exemplary embodiment of the present disclosure.

FIG. 6 summarizes a proposed dynamic TDD configuration mechanism from the perspective of a base station in accordance with an exemplary embodiment of the present disclosure. In step S701, the base station transmits a current time division duplex (TDD) configuration which could be legacy UE compatible and could be transmitted via a system information. In step S702, the base station selects a dynamic TDD configuration from an allowable set of dynamic TDD configuration, and the allowable set of dynamic TDD configuration is based on the current dynamic TDD configuration. In step S703, the base station transmits and receives data based on the dynamic TDD configuration.

In view of the aforementioned descriptions, the present disclosure is suitable for being used in a wireless communication system and is able to dynamically configure or re-configure TDD DL-UL configurations for new UEs (LTE release 12 or after) in a way that would be backward compatible with legacy UEs (before LTE release 12).

In this disclosure, 3GPP-like keywords or phrases are used merely as examples to present inventive concepts in accordance with the present disclosure; however, the same concept presented in the disclosure can be applied to any other systems such as IEEE 802.11, IEEE 802.16, WiMAX, and so like by persons of ordinarily skilled in the art.

A base station in this disclosure may also include base stations such as an advanced base station (ABS), a base transceiver system (BTS), a node B, an evolved node B (eNB), a home eNB, a macro base station, a pico base station, a femto base station, an access point, a home base station, a relay station, a repeater, an intermediate node, an intermediary, and/or satellite-based communication base stations.

From the hardware perspective, a base station may include at least but not limited to a transmitter circuit, a receiver circuit, an analog-to-digital (A/D) converter, a digital-to-analog (D/A) converter, a processing circuit, one or more antenna units, and optionally a storage medium. The transmitter and the receiver transmit downlink signals and receive uplink signals wirelessly. The receiver may include functional elements to perform operations such as low noise amplifying, impedance matching, frequency mixing, down frequency conversion, filtering, amplifying, and so forth. The transmitter may include function elements to perform operations such as amplifying, impedance matching, frequency mixing, up frequency conversion, filtering, power amplifying, and so forth. The analog-to-digital (A/D) or the digital-to-analog (D/A) converter is configured to convert from an analog signal format to a digital signal format during uplink signal processing and from a digital signal format to an analog signal format during downlink signal processing.

The processing circuit is configured to process digital signal and to perform functions, processes or procedures, or method steps of the proposed method in exemplary embodiments of the present disclosure. Also, the processing circuit may optionally be coupled to a memory circuit to store programming codes, device configurations, a codebook, buffered or permanent data, and etc. . . . . The functions of the processing circuit may be implemented using programmable units such as a micro-processor, a micro-controller, a DSP chips, FPGA, etc. The functions of the processing circuit may also be implemented with separate electronic devices or ICs, and the processing circuit may also be implemented with either hardware or software.

The term "user equipment" (UE) in this disclosure could represent various embodiments which for example could include but not limited to a mobile station, an advanced mobile station (AMS), a server, a client, a desktop computer, a laptop computer, a network computer, a workstation, a personal digital assistant (PDA), a tablet personal computer (PC), a scanner, a telephone device, a pager, a camera, a television, a hand-held video game device, a musical device, a wireless sensor, and so like. In some applications, a UE may be a fixed computer device operating in a mobile environment, such as a bus, train, an airplane, a boat, a car, and so forth.

From the hardware perspective, a UE may include at least but not limited to a transmitter circuit, a receiver circuit, an analog-to-digital (A/D) converter, a digital-to-analog (D/A) converter, a processing circuit, one or more antenna units, and optionally a memory circuit. The memory circuit may store programming codes, device configurations, buffered or permanent data, codebooks, and etc. . . . . The processing circuit may also be implemented with either hardware or software and would be considered to implement the functions, processes or procedures, and method steps of embodiments of the present disclosure. The function of each element of a UE is similar to a control node and therefore detailed descriptions for each element will not be repeated.

No element, act, or instruction used in the detailed description of disclosed embodiments of the present application should be construed as absolutely critical or essential to the present disclosure unless explicitly described as such. Also, as used herein, each of the indefinite articles "a" and "an" could include more than one item. If only one item is intended, the terms "a single" or similar languages would be used. Furthermore, the terms "any of" followed by a listing of a plurality of items and/or a plurality of categories of items, as used herein, are intended to include "any of", "any combination of", "any multiple of", and/or "any combination of multiples of the items and/or the categories of items, individually or in conjunction with other items and/or other categories of items. Further, as used herein, the term "set" is intended to include any number of items, including zero. Further, as used herein, the term "number" is intended to include any number, including zero.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

Moreover, the claims should not be read as limited to the described order or elements unless stated to that effect. In addition, use of the term "means" in any claim is intended to invoke 35 U.S.C. §112, ¶6, and any claim without the word "means" is not so intended.

What is claimed is:

1. A dynamic TDD configuration method, applicable to a base station, and the method comprising:
 transmitting a current time division duplex (TDD) configuration compatible to legacy user equipment (UE) in a system information block, wherein the legacy UE do not support a dynamic re-configuration for TDD configuration;
 selecting a dynamic TDD configuration based on the current TDD configuration after transmitting the current TDD configuration;
 transmitting the dynamic TDD configuration; and
 transmitting a downlink reference signal in each downlink subframe in the dynamic TDD configuration,
 wherein: the dynamic TDD configuration is a subset of an allowable set comprising one or more possible TDD configurations by which each downlink subframe of the current TDD configuration is not re-configured to an uplink subframe by the dynamic TDD configuration selected from the allowable set.

2. The method of claim 1, wherein the allowable set further comprises one or more possible TDD configurations by which each subframe of the current TDD configuration allocated for a hybrid automatic repeat request (HARQ) uplink is not re-configured to a downlink subframe by the dynamic TDD configuration selected from the allowable set.

3. The method of claim 2, wherein if the current TDD configuration is 0, 5, or 6, the dynamic TDD configuration is allowable if the dynamic TDD configuration is 0, 5, or 6 respectively.

4. The method of claim 2, wherein if the current TDD configuration is 1, the dynamic TDD configuration is allowable if the dynamic TDD configuration is 1, 2, 4, or 5.

5. The method of claim 2, wherein if the current TDD configuration is 2, the dynamic TDD configuration is allowable if the dynamic TDD configuration is 2 or 5.

6. The method of claim 2, wherein if the current TDD configuration is 3, the dynamic TDD configuration is allowable if the dynamic TDD configuration is 3, 4, or 5.

7. The method of claim 2, wherein if the current TDD configuration is 4, the dynamic TDD configuration is allowable if the dynamic TDD configuration is 4, or 5.

8. The method of claim 1, wherein if the current TDD configuration is 0, the dynamic TDD configuration is allowable if the dynamic TDD configuration is 0, 1, 2, 3, 4, 5 or 6.

9. The method of claim 1, wherein if the current TDD configuration is 6, the dynamic TDD configuration is allowable if the dynamic TDD configuration is 1, 2, 3, 4, 5 or 6.

10. A base station comprising a transmitter and a receiver which transmit and receive data respectively and a processor coupled to the transmitter and the receiver and is configured for:
 transmitting a current time division duplex (TDD) configuration compatible to legacy user equipment (UE) through the transmitter in a system information block, wherein the legacy UE do not support a dynamic re-configuration for TDD configuration;
 selecting a dynamic TDD configuration based on the current TDD configuration after transmitting the current TDD configuration;
 transmitting the dynamic TDD configuration through the transmitter; and
 transmitting a downlink reference signal in each downlink subframe in the dynamic TDD configuration,
 wherein: the dynamic TDD configuration is a subset of an allowable set comprising one or more possible TDD configurations by which each downlink subframe of the current TDD configuration is not re-configured to an uplink subframe by the dynamic TDD configuration selected from the allowable set.

11. The base station of claim 10, wherein the allowable set further comprises one or more possible TDD configurations by which each subframe of the current TDD configuration allocated for a hybrid automatic repeat request (HARD) uplink is not re-configured to a downlink subframe by the dynamic TDD configuration selected from the allowable set.

12. The base station of claim 11, wherein if the current TDD configuration is 0, 5, or 6, the allowable set is 0, 5, or 6 respectively.

13. The base station of claim 11, wherein if the current TDD configuration is 1, the allowable set is 1, 2, 4, and 5.

14. The base station of claim 11, wherein if the current TDD configuration is 2, the allowable set is 2 and 5.

15. The base station of claim 11, wherein if the current TDD configuration is 3, the allowable set is 3, 4, and 5.

16. The base station of claim 11, wherein if the current TDD configuration is 4, the allowable set is 4 and 5.

17. The base station of claim 10, wherein if the current TDD configuration is 0, the dynamic TDD configuration is allowable if the dynamic TDD configuration is 0, 1, 2, 3, 4, 5 or 6.

18. The base station of claim 10, wherein if the current TDD configuration is 6, the dynamic TDD configuration is allowable if the dynamic TDD configuration is 1, 2, 3, 4, 5 or 6.

* * * * *